United States Patent
Lu et al.

(10) Patent No.: US 12,170,359 B2
(45) Date of Patent: Dec. 17, 2024

(54) CELL AND BATTERY

(71) Applicant: Guangdong Xinli Energy Co., Ltd., Guangdong (CN)

(72) Inventors: Haijun Lu, Guangdong (CN); Pengdong Li, Guandong (CN)

(73) Assignee: GUANGDONG XINLI ENERGY CO., LTD., Zhongshan (CN)

(*) Notice: Subject to any disclaimer, the term of this patent is extended or adjusted under 35 U.S.C. 154(b) by 756 days.

(21) Appl. No.: 17/310,511

(22) PCT Filed: Dec. 1, 2020

(86) PCT No.: PCT/CN2020/133148
§ 371 (c)(1),
(2) Date: Aug. 6, 2021

(87) PCT Pub. No.: WO2022/062173
PCT Pub. Date: Mar. 31, 2022

(65) Prior Publication Data
US 2022/0238941 A1    Jul. 28, 2022

(30) Foreign Application Priority Data

Sep. 28, 2020   (CN) .......................... 202011044302.0

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/643* (2015.04);
(Continued)

(58) Field of Classification Search
CPC ............. H01M 10/613; H01M 10/643; H01M 10/654; H01M 10/6556; H01M 10/6562;
(Continued)

(56) References Cited

U.S. PATENT DOCUMENTS

| 6,114,059 A | 9/2000 | Watanabe et al. |
| 2016/0301118 A1 | 10/2016 | Chami et al. |

(Continued)

FOREIGN PATENT DOCUMENTS

| CN | 105684189 | 6/2016 |
| CN | 106784974 | 5/2017 |

(Continued)

OTHER PUBLICATIONS

International Search Report for PCT/CN2020/133148, China National Intellectual Property Administration, Jul. 9, 2021.
(Continued)

*Primary Examiner* — Lingwen R Zeng
(74) *Attorney, Agent, or Firm* — Gottlieb, Rackman & Reisman, PC

(57) ABSTRACT

A cell and a battery are disclosed. The cell includes: a barrel, a first end cover and a second end cover being arranged at two ends of the barrel respectively, the barrel, the first end cover and the second end cover defining an accommodating space in which a battery cell assembly is arranged; and a heat exchange pipe passing through the first end cover, the second end cover, and the accommodating space, and an outer wall of the heat exchange pipe being in contact with the battery cell assembly. The battery includes at least two cells, the heat exchange pipes of the adjacent cells communicate with each other, so that external fluid can enter the heat exchange pipe at one end of the battery pack and then exchange heat with all the cells.

8 Claims, 3 Drawing Sheets

(51) Int. Cl.
  *H01M 10/643*  (2014.01)
  *H01M 50/152*  (2021.01)
  *H01M 50/186*  (2021.01)
  *H01M 10/654*  (2014.01)
  *H01M 10/6556*  (2014.01)
  *H01M 10/6562*  (2014.01)
  *H01M 10/6563*  (2014.01)
  *H01M 50/213*  (2021.01)
  *H01M 50/51*  (2021.01)

(52) U.S. Cl.
  CPC ....... *H01M 50/152* (2021.01); *H01M 50/186* (2021.01); *H01M 10/654* (2015.04); *H01M 10/6556* (2015.04); *H01M 10/6562* (2015.04); *H01M 10/6563* (2015.04); *H01M 50/213* (2021.01); *H01M 50/51* (2021.01); *Y02E 60/10* (2013.01)

(58) Field of Classification Search
  CPC ......... H01M 10/6563; H01M 10/6568; H01M 50/152; H01M 50/186; H01M 50/213; H01M 50/51; Y02E 60/10
  See application file for complete search history.

(56) References Cited

U.S. PATENT DOCUMENTS

2017/0207433 A1*  7/2017  Hong ................ H01M 10/0431
2021/0265682 A1*  8/2021  Lee ..................... H01M 50/269

FOREIGN PATENT DOCUMENTS

| CN | 211507693 | 9/2020 |
| JP | H08298107 | 11/1996 |
| JP | H1133976 | 2/1999 |

OTHER PUBLICATIONS

International Written Opinion for PCT/CN2020/133148, China National Intellectual Property Administration, Jul. 9, 2021.

* cited by examiner

CELL AND BATTERY

CROSS-REFERENCE TO RELATED APPLICATIONS

This application is a national stage filing under 35 U.S.C. § 371 of international application number PCT/CN2020/133148, filed Dec. 1, 2020, which claims priority to Chinese patent application No. 2020110443020 filed Sep. 28, 2020. The contents of these applications are incorporated herein by reference in their entirety.

TECHNICAL FIELD

The disclosure relates to a cell and a battery.

BACKGROUND

At present, an ordinary battery may exchange heat only by a housing that wraps a battery cell assembly, resulting in a poor heat exchange effect. When internal temperature of a battery is too high, the battery may accumulate heat inside, resulting in drop of its charge-discharge efficiency and reliability. When the battery is exposed to an extremely cold environment, the internal temperature of the battery will be too low. In such two cases, electric energy utilization efficiency and reliability may be affected.

SUMMARY

The disclosure is intended to solve at least one of technical problems in existing technologies. For this purpose, the disclosure provides a cell with good heat exchange.

The disclosure further provides a battery. Each cell of the battery can realize a good heat exchange effect, thereby improving an energy utilization rate of the battery.

A cell according to embodiments in a first aspect of the disclosure is provided including: a barrel, a first end cover and a second end cover being arranged at two ends of the barrel respectively, the barrel, the first end cover and the second end cover defining an accommodating space in which a battery cell assembly is arranged; and a heat exchange pipe passing through the first end cover, the second end cover, and the accommodating space, and an outer wall of the heat exchange pipe being in contact with the battery cell assembly.

The cell according to embodiments of the disclosure at least has the beneficial effects as below.

The cell includes the heat exchange pipe that penetrates through the cell, and the outer wall of the heat exchange pipe makes contact with the battery cell assembly, so that when the heat exchange pipe communicates with external low-temperature fluid to exchange heat with the battery cell assembly, part of heat generated by the battery cell assembly can be brought away, thereby avoiding the drop of charge-discharge efficiency and reliability due to the rise of internal temperature of the battery; when the heat exchange pipe communicates with external warm fluid to exchange heat with the battery cell assembly, temperature of the battery cell assembly can be rapidly increased when it is exposed to an extremely cold condition, thereby improving electric energy utilization efficiency of the cell.

In some embodiments of the disclosure, the heat exchange pipe includes a central pipe, a first joint and a second joint, the first end cover is provided with a first mounting hole and the second end cover is provided with a second mounting hole, the first mounting hole and the second mounting hole are both mated with the central pipe, the first joint is detachably connected to one end of the central pipe and tightly pressed on the first end cover, the second joint is detachably connected to the other end of the central pipe and tightly pressed on the second end cover, the first joint has a first via hole and the second joint has a second via hole, the first via hole and the second via hole both communicate with an interior of the central pipe.

In some embodiments of the disclosure, two ends of the central pipe are in threaded connection with the first joint and the second joint respectively.

In some embodiments of the disclosure, the cell further includes a first sealing element arranged between the first joint and the first end cover in a sealing manner, and a second sealing element arranged between the second joint and the second end cover in a sealing manner.

In some embodiments of the disclosure, a connecting sleeve for connecting to a second end cover of another cell is arranged on the first end cover.

In some embodiments of the disclosure, the first end cover is provided with a first internal thread, the second end cover is provided with a second internal thread, the connecting sleeve is provided with a first external thread that is connected to the first internal thread and a second external thread that is mated with the second internal thread.

The disclosure further provides a battery, including at least two cells of any of the above technical themes, where the cells are sequentially connected in series through a connecting sleeve, and the heat exchange pipes on the adjacent cells communicate with each other.

The battery according to embodiments of the disclosure at least has the beneficial effects as below.

The battery includes at least two cells that are sequentially connected in series through a connecting sleeve, the heat exchange pipes of the adjacent cells communicate with each other, so that external fluid can enter the heat exchange pipe at one end of the battery and then leave the heat exchange pipe at the other end of the battery, to exchange heat with all the cells of the battery.

In some embodiments of the disclosure, the adjacent cells and the corresponding connecting sleeve define an enclosed chamber, and the heat exchange pipes both communicate with the enclosed chamber.

In some embodiments of the disclosure, a side wall of the connecting sleeve is provided with a through hole that communicates the enclosed chamber with outside, and the through hole is detachably mounted with a sealing plug.

In some embodiments of the disclosure, the adjacent heat exchange pipes are connected with each other through a third joint, the third joint has an inner hole channel that communicates with interiors of the adjacent heat exchange pipes.

Additional aspects and advantages of the disclosure will be partly given in the description below. This part will become clear in the following description or will be understood by practice of the disclosure.

BRIEF DESCRIPTION OF DRAWINGS

The aforesaid and/or additional aspects and advantages of the disclosure will become clear and easy to understand from the description of the embodiments in conjunction with the following accompanying drawings.

DETAILED DESCRIPTION

Figure 1:
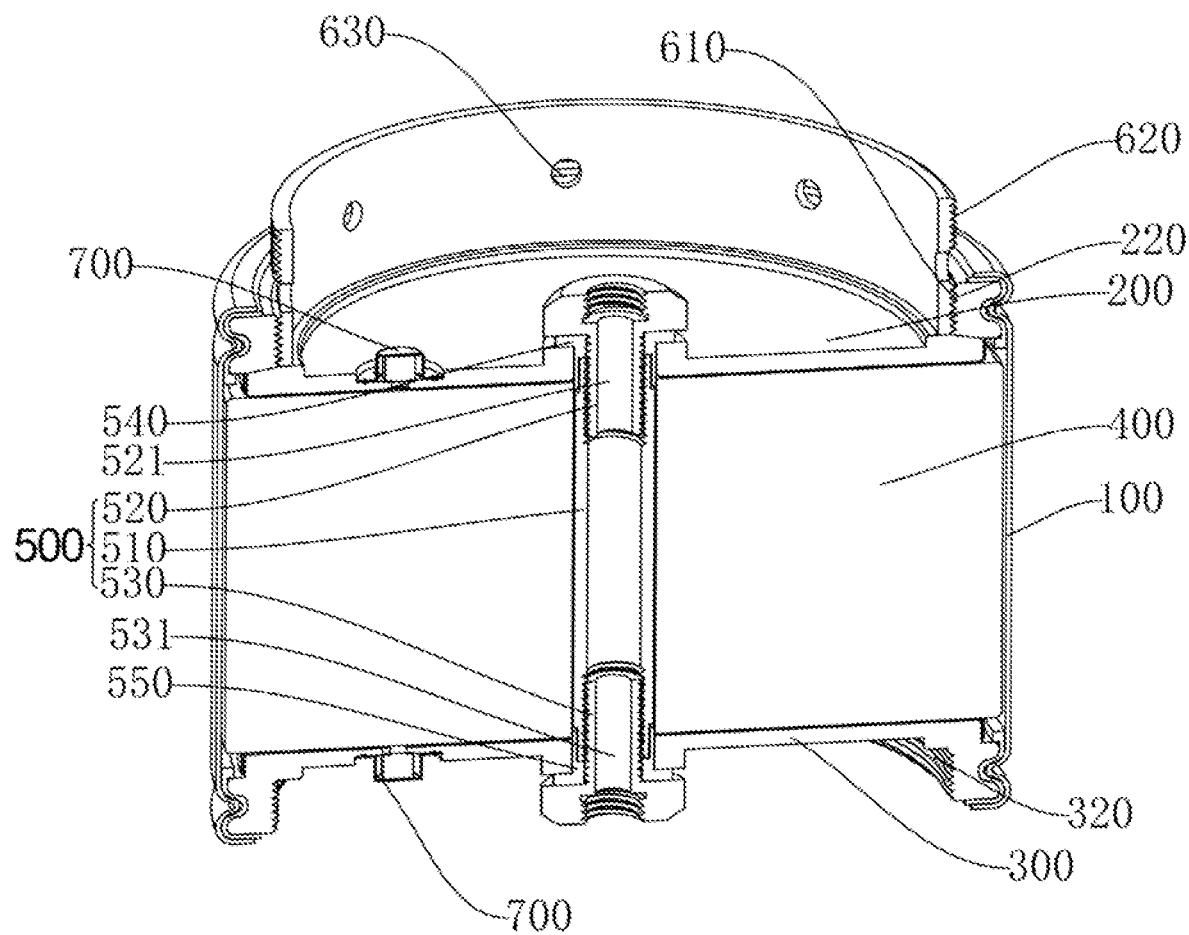
FIG. 1 is a schematic diagram of an internal structure of a cell according to an embodiment of the disclosure.

The embodiments of the disclosure are described in detail as below. Examples of the embodiments are illustrated in the drawings. Identical or like reference numerals represent identical or like elements or elements that have identical or like functions from beginning to end. The embodiments as described below with reference to the accompanying drawings are exemplary and are merely for interpreting the disclosure and should not be understood as limiting the disclosure.

In the description of the disclosure, it should be understood that the orientation or positional relationships referred to, e.g., the terms "upper", "lower", "front", "rear", "left", "right", "vertical", "horizontal", "top", "bottom", "inner", "outer", etc. are the orientation or positional relationships as shown in the accompanying drawings and are merely for convenience in describing the disclosure and simplifying this description, but not to indicate or imply that a device or element referred to must have a particular orientation and be constructed and operated in a particular orientation, and thus they should not be construed as limiting the disclosure.

In the description of the disclosure, the term "several" means one or more, the term "a plurality of" means two or more, the terms "greater than", "less than", "exceed", etc. are interpreting as excluding this number, and the terms "above", "below", "within", etc. are interpreting as including this number. The terms "first" and "second", if stated, are only used for the purpose of distinguishing technical features, and they cannot be understood as indicating or implying relative importance or implicitly indicating the number of technical features indicated or implicitly indicating the precedence relationship of technical features indicated.

In the description of the disclosure, unless otherwise specified and defined, it should be noted that the terms "mount", "interconnect" and "connect" are to be understood broadly. For example, it may be fixed connection, detachable connection or integral connection; may be mechanical connection or electrical connection; may be direct connection, or indirect connection by an intermediate medium, or may be interconnection within two elements. The specific meaning of the above terms in the disclosure may be understood by those having ordinary skill in the art.

Referring to FIG. 1, a cell according to an embodiment in a first aspect of the disclosure includes: a barrel 100, where a first end cover 200 and a second end cover 300 are arranged at two ends of the barrel 100 respectively, and the barrel 100, the first end cover 200 and the second end cover 300 define an accommodating space in which a battery cell assembly 400 is arranged; and a heat exchange pipe 500 arranged on the first end cover 200 and the second end cover 300 in a penetrating manner, where the heat exchange pipe 500 penetrates through the accommodating space, and an outer wall of the heat exchange pipe 500 is in contact with the battery cell assembly 400. The cell includes the heat exchange pipe 500 that penetrates through the cell, and the outer wall of the heat exchange pipe 500 makes contact with the battery cell assembly 400, so that when the heat exchange pipe 500 communicates with external low-temperature fluid to exchange heat with the battery cell assembly 400, part of heat generated by the battery cell assembly 400 can be brought away, thereby avoiding the drop of charge-discharge efficiency and reliability due to the rise of internal temperature of the battery; when the heat exchange pipe 500 communicates with external warm fluid to exchange heat with the battery cell assembly 400, temperature of the battery cell assembly 400 can be rapidly increased when it is exposed to an extremely cold condition, thereby improving electric energy utilization efficiency.

Referring to FIG. 1, in some embodiments of the disclosure, the heat exchange pipe 500 includes a central pipe 510, a first joint 520 and a second joint 530, a first via hole 521 and a second via hole 531 that communicate with the interior of the central pipe 510 are formed in the first joint 520 and the second joint 530 respectively, the first via hole 521 and the second via hole 531 right face two ports of the central pipe 510 respectively, a first mounting hole and a second mounting hole that are mated with the central pipe 510 are formed in the first end cover 200 and the second end cover 300 respectively, the first mounting hole and the second mounting hole allow two ends of the central pipe 510 to penetrate through respectively, the first joint 520 is detachably connected to one end of the central pipe 510 and tightly pressed on the first end cover 200, the second joint 530 is detachably connected to the other end of the central pipe 510 and tightly pressed on the second end cover 300, and the first joint 520 and the second joint 530 can fix the central pipe 510 in the cell and also can reinforce the connection between the first end cover 200 and the barrel 100 and the connection between the second end cover 300 and the barrel 100.

Referring to FIG. 1, in some embodiments of the disclosure, the two ends of the central pipe 510 are in threaded connection with the first joint 520 and the second joint 530 respectively, to simplify the mounting way.

Referring to FIG. 1, in some embodiments of the disclosure, for the cell with electrolyte contained in the barrel 100, in order to avoid electrolyte leakage, the cell further includes a first sealing element 540 and a second sealing element 550, the first sealing element 540 is arranged between the first joint 520 and the first end cover 200 in a sealing manner, and the second sealing element 550 is arranged between the second joint 530 and the second end cover 300 in a sealing manner.

Figure 2:
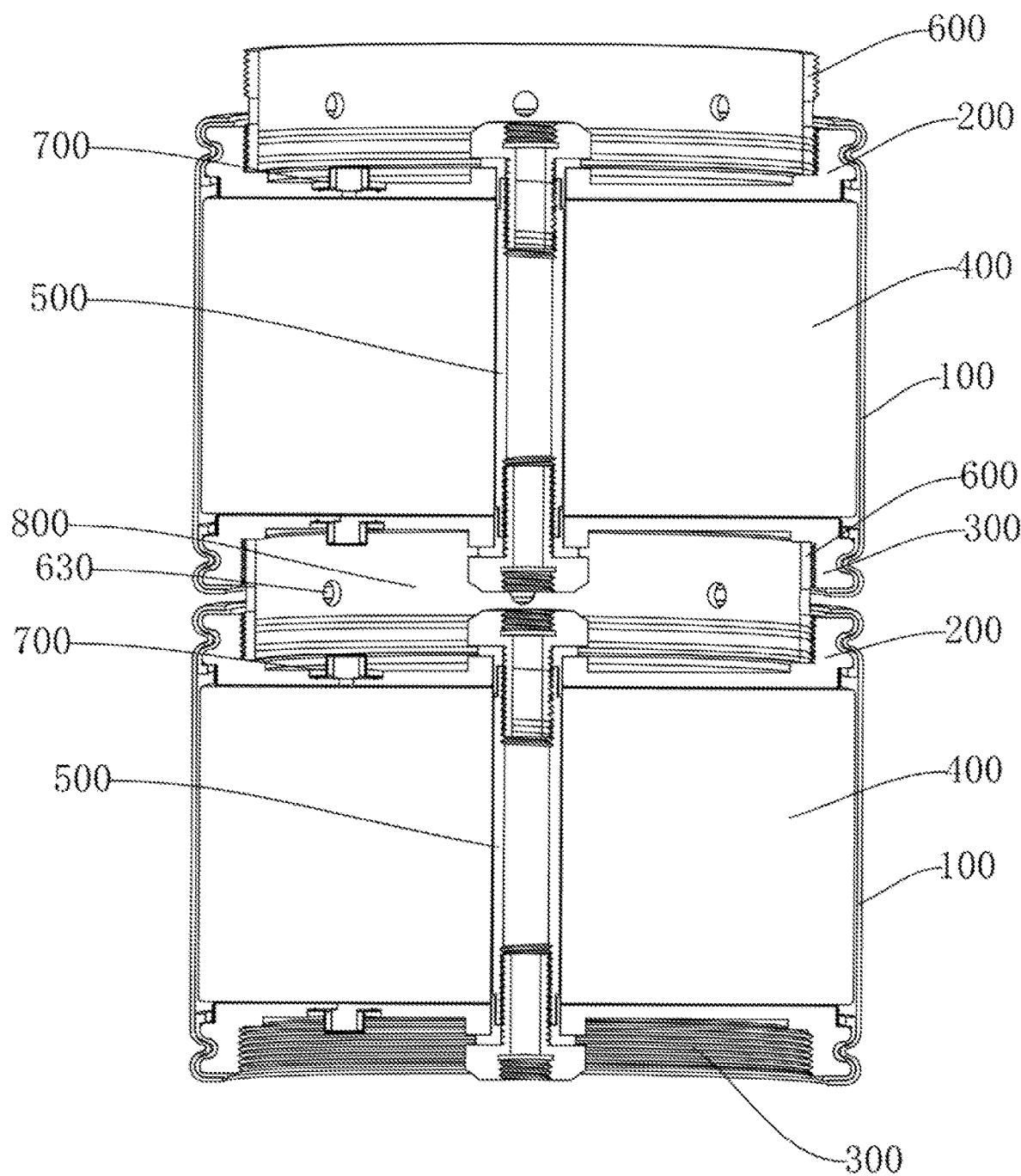
FIG. 2 is a schematic diagram of an internal structure of a battery according to an embodiment of the disclosure.

Referring to FIG. 1 and FIG. 2, in some embodiments of the disclosure, a connecting sleeve 600 for connecting a second end cover 300 of the other cell is arranged on the first end cover 200, to realize the interconnection of a plurality of cells.

In some embodiments of the disclosure, the first end cover 200 is provided with a first internal thread 220, the second end cover 300 is provided with a second internal thread 320, the connecting sleeve 600 is provided with a first external thread 610 that is connected to the first internal thread 220 and a second external thread 620 that is mated with the second internal thread 320. That is, two adjacent cells are connected with each other through the threads, the number of cells in series connection may be freely adjusted. Moreover, when only one cell is used, the connecting sleeve 600 may be demounted from the cell without affecting the use.

In some embodiments of the disclosure, the battery cell assembly 400 includes a winding core assembly and an electrolyte that are arranged in the accommodating space, at least one of the first end cover 200 and the second end cover 300 is provided with an injection port, and a safety valve 700 is detachably mounted on the injection port.

Figure 3:
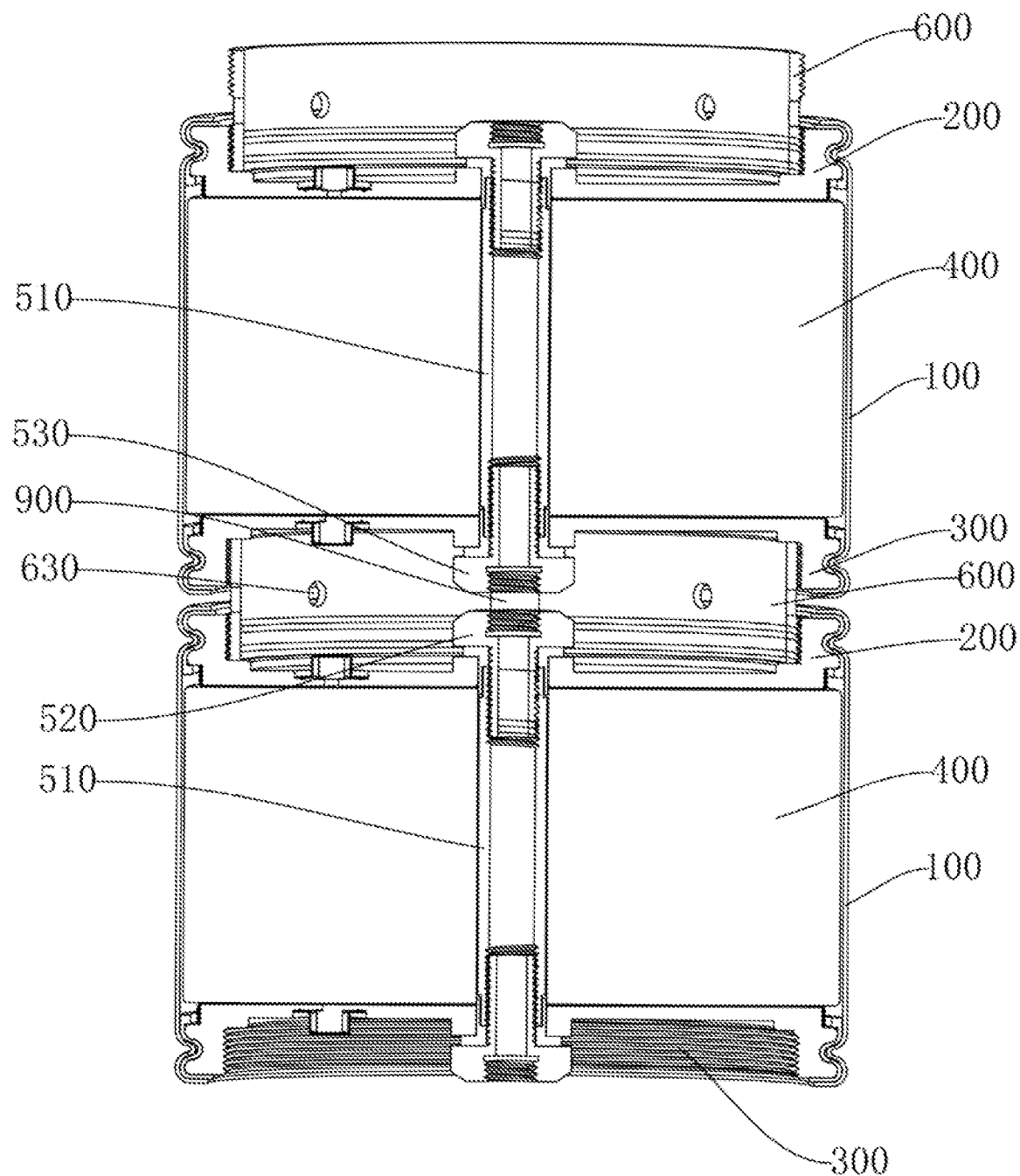
FIG. 3 is a schematic diagram of an internal structure of a battery according to another embodiment of the disclosure.

Referring to FIG. 2 or FIG. 3, the disclosure further introduces a battery. The battery includes at least two cells of any of the above technical themes that are sequentially connected in series through the connecting sleeve 600, and the heat exchange pipes 500 of adjacent cells communicate with each other. External fluid may enter the heat exchange pipe 500 at one end of the battery and then leave the heat exchange pipe 500 at the other end of the battery, to exchange heat with all the cells of the battery.

Referring to FIG. 1 and FIG. 2, in some embodiments of the disclosure, an enclosed chamber 800 is defined by the adjacent cells and the corresponding connecting sleeve 600, and the heat exchange pipes 500 of the adjacent cells both communicate with the enclosed chamber 800.

Referring to FIG. 3, in some embodiments of the disclosure, the adjacent heat exchange pipes 500 are connected with each other through a third joint 900, the third joint 900 has an inner hole channel that communicates with the interiors of the adjacent heat exchange pipes 500. The heat exchange pipes 500 are connected with each other to form an enclosed pipeline, and communication can be realized without using the enclosed chamber 800 of the above embodiments.

Referring to FIG. 1 and FIG. 2, in some embodiments of the disclosure, a side wall of the connecting sleeve 600 is provided with a through hole 630 that communicates the enclosed chamber 800 with outside, and a sealing plug for sealing the through hole 630 is detachably arranged in the through hole 630. When there is no external fluid entering the heat exchange pipes 500, the sealing plug is detached from the through hole 630, heat that is transferred to the first end cover 200 and the second end cover 300 may be discharged out of the through hole 630 in the form of hot airflow, or external airflow may enter the enclosed chamber 800 from the through hole 630 to exchange heat with the first end cover 200 and the second end cover 300.

In some embodiments of the disclosure, the side wall of the connecting sleeve 600 is provided with a plurality of through holes 630 that are distributed circumferentially around the axis of the heat exchange pipe 500.

The technical features of the embodiments described above may be arbitrarily combined, and for the sake of brevity of the description, not all possible combinations of the technical features of the embodiments described above are described. However, as long as the combination of these technical features is not contradictory, it should be considered as falling within the scope of this specification.

Although the embodiments of the disclosure have been illustrated and described, it should be understood by those having ordinary skill in the art that various changes, modifications, replacements and variations of these embodiments can be made without departing from the principle and purpose of the disclosure and the scope of the disclosure is defined by claims and its equivalents.

What is claimed is:

1. A cell, comprising:
   a barrel, a first end cover and a second end cover being arranged at two ends of the barrel respectively, the barrel, the first end cover and the second end cover defining an accommodating space in which a battery cell assembly is arranged; and
   a heat exchange pipe passing through the first end cover, the second end cover, and the accommodating space, and an outer wall of the heat exchange pipe being in contact with the battery cell assembly;
   wherein a connecting sleeve for connecting a second end cover of another cell is arranged on the first end cover;
   wherein the first end cover is provided with a first internal thread, the second end cover is provided with a second internal thread, the connecting sleeve is provided with a first external thread that is connected to the first internal thread and a second external thread that is mated with the second internal thread.

2. The cell of claim 1, wherein the heat exchange pipe comprises a central pipe, a first joint and a second joint, the first end cover is provided with a first mounting hole and the second end cover is provided with a second mounting hole, the first mounting hole and the second mounting hole are both mated with the central pipe, the first joint is detachably connected to one end of the central pipe and tightly pressed on the first end cover, the second joint is detachably connected to the other end of the central pipe and tightly pressed on the second end cover, the first joint has a first via hole and the second joint has a second via hole, the first via hole and the second via hole both communicate with an interior of the central pipe.

3. The cell of claim 2, wherein two ends of the central pipe are in threaded connection with the first joint and the second joint respectively.

4. The cell of claim 2, further comprising a first sealing element arranged between the first joint and the first end cover in a sealing manner, and a second sealing element arranged between the second joint and the second end cover in a sealing manner.

5. A battery, comprising at least two cells of claim 1, wherein the cells are sequentially connected in series through the connecting sleeve, and the heat exchange pipes on adjacent cells communicate with each other.

6. The battery of claim 5, wherein the adjacent cells and the corresponding connecting sleeve define an enclosed chamber, and the heat exchange pipes both communicate with the enclosed chamber.

7. The battery of claim 6, wherein a side wall of the connecting sleeve is provided with a through hole that communicates the enclosed chamber with outside, and the through hole is detachably mounted with a sealing plug.

8. The battery of claim 5, wherein the adjacent heat exchange pipes are connected with each other through a third joint, the third joint has an inner hole channel that communicates with interiors of the adjacent heat exchange pipes.

* * * * *